J. R. GRAY.
Horse-Power.

No. 166,358.

Patented Aug. 3, 1875.

WITNESSES
F. L. Ourand
C. M. Bart.

INVENTOR
J. R. Gray.
Branch Mason
Attorney

UNITED STATES PATENT OFFICE.

JAMES R. GRAY, OF CHESTERVILLE, MISSISSIPPI.

IMPROVEMENT IN HORSE-POWERS.

Specification forming part of Letters Patent No. 166,358, dated August 3, 1875; application filed April 16, 1875.

*To all whom it may concern:*

Be it known that I, JAMES R. GRAY, of Chesterville, in the county of Pontotoc and in the State of Mississippi, have invented certain new and useful Improvements in Horse-Powers; and do hereby declare that the following is a full, clear, and exact description thereof, reference being had to the accompanying drawings, and to the letters of reference marked thereon, making a part of this specification.

The nature of my invention consists in the construction and arrangement of the several parts of a horse-power, substantially as hereinafter set forth.

Figure 1:
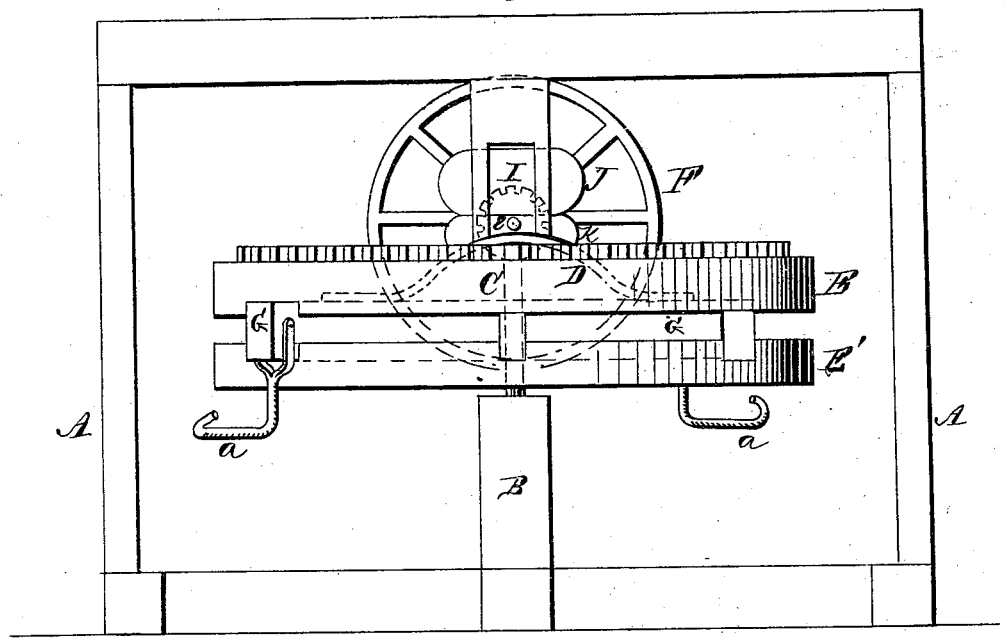
Figures 2, 3:
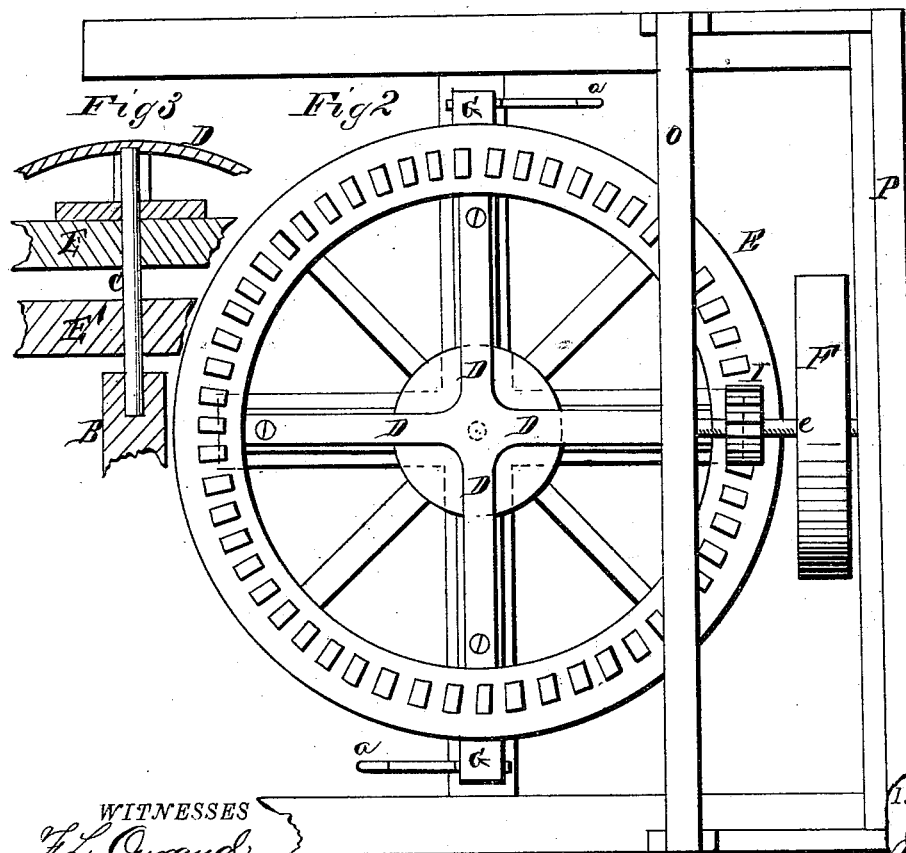

In the annexed drawing, making a part of this specification, Figure 1 represents a side view of the machine, and Fig. 2 a plan view of the same.

In the figure, A represents the frame of the horse-power, which may be constructed in any of the known and usual ways. Upon the base or bottom of this frame is erected a post, B. Projecting above, and secured in this post, is a shaft, C. E represents a large gear-wheel, and E' represents a wheel, connected to it and beneath it, as hereinafter described. The gear-wheel E is provided with a suitable hub, and this hub with a suitable box. The shaft C passes into the box of this hub, the wheel E being then in a horizontal position. Secured to the arms or spokes of the wheel E is a metallic bridge, D D, in the under side of which is a bearing to receive the upper end of the shaft C.

It will thus be seen that the wheel E revolves around the shaft C, the upper end of said shaft acting as a pivot.

Between the wheels E and E' is inserted and clamped a cross-bar, G, having depending therefrom a hook at each end, for the attachment of the horse or horses. By this means the power of the animals is exerted directly from the master-wheel, and the cross-bar to which the power is applied is so strengthened by being between the two wheels that it is not liable to become broken by a sudden jerk of the animals, and cannot easily get out of position. This connection also allows a direct action of the power, and avoids the usual lost motion incident to this class of machinery.

The post B is sufficiently high to allow the horse to pass freely under the wheel E'. F represents the band-wheel, which is secured, together with a pinion, I, upon a square shaft, $e$. This shaft $e$ has its bearing in a portion of the frame, and is located above the wheel E, so that its teeth are engaged with the teeth in said wheel. This shaft $e$ bears directly upon or in the bar K, and is confined in position by means of the wedge J, which serves to keep said bar, as well as the shaft, in proper position.

The pinion I has a square opening through it to fit the shaft $e$, and is allowed to slide upon said shaft, so that the power may be thrown in or out of gear at will.

This horse-power is simple and cheap, and admirably adapted to driving a cotton-gin or other light machinery.

Having thus fully described my invention, what I claim as new, and desire to secure by Letters Patent, is—

The combination of the wheels E E', cross-bar G, clamped between the two, and having hooks $a\ a$, the pinion I, bridge D, shafts C $e$, and wheel F, all constructed substantially as forth.

In testimony that I claim the foregoing I have hereunto set my hand and seal this 22d day of March, 1875.

JAMES R. GRAY. [L. S.]

Witnesses:
J. L. MORPHIS,
I. B. BASKIN.